March 23, 1965   J. W. ROHAN   3,174,241
PORTABLE DICTIONARY ON FILM READING DEVICE
Filed March 26, 1962   2 Sheets-Sheet 1
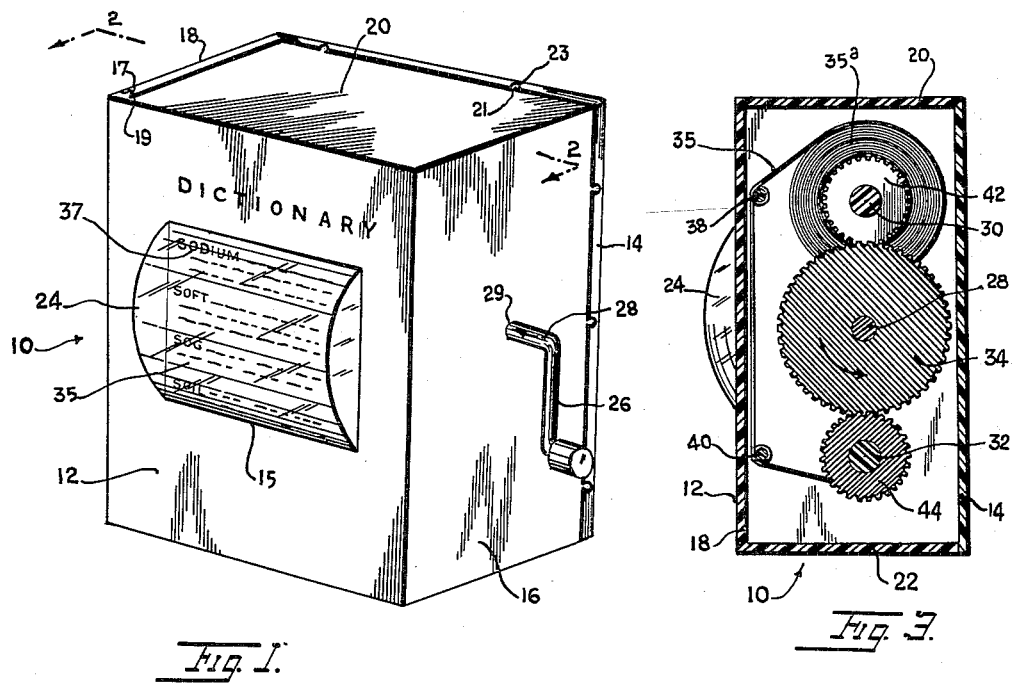
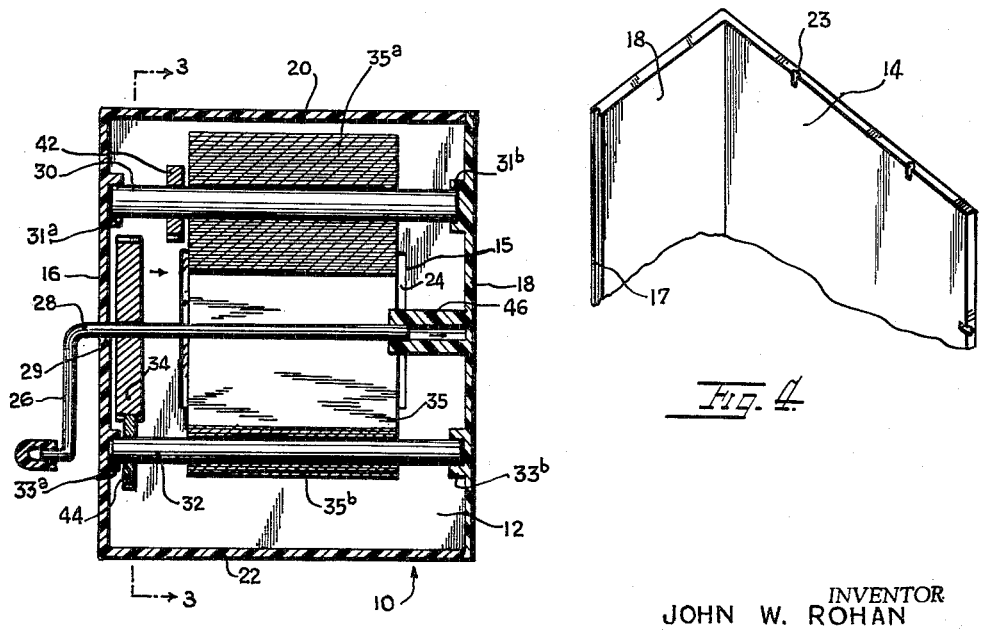
INVENTOR
JOHN W. ROHAN

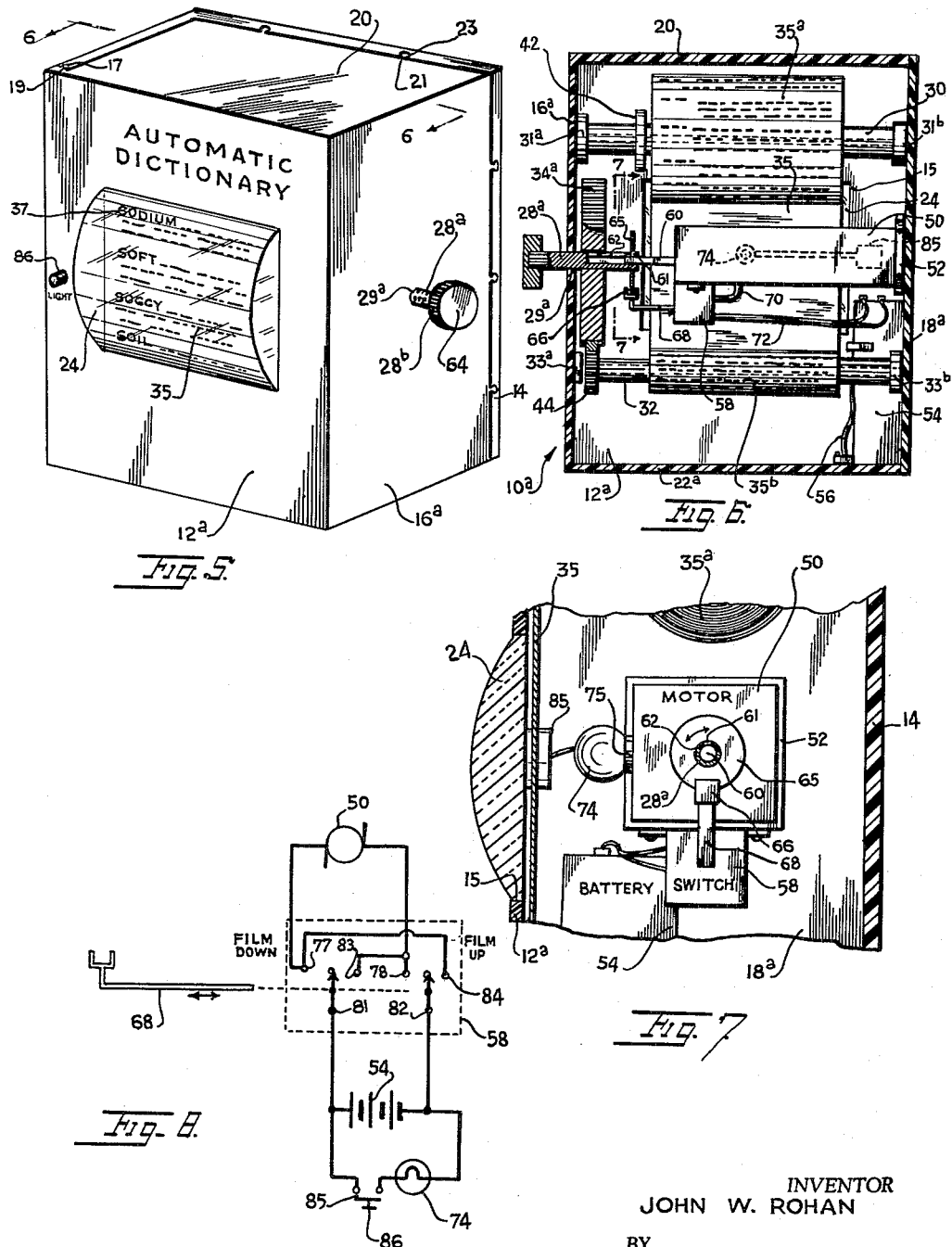

United States Patent Office

3,174,241
Patented Mar. 23, 1965

3,174,241
PORTABLE DICTIONARY ON FILM READING DEVICE
John W. Rohan, 67 St. Paul Place, Brooklyn, N.Y.
Filed Mar. 26, 1962, Ser. No. 182,531
1 Claim. (Cl. 40—95)

This invention relates to a display apparatus and more particularly concerns a portable dictionary or film reading device.

According to the invention there is provided a dictionary of language, technical terms, and the like, printed on transparent or opaque film or tape. The definitions of the terms defined are necessarily printed in very small type so that a large number of definitions can be provided on film of reasonable size. In the present invention there is provided a roll of flexible plastic film or tape which may be several hundred feet in length. The tape is mounted on rollers arranged to be driven by suitable gears manually or by an electric motor. The roll of film is supported in a casing provided with a magnifying lens at an opening therein. The lens magnifies the small type printed on the film. The gearing of the device permits the film to be driven at high or low speed in forward and reverse directions under control of the user. A lamp may be disposed inside the casing to shine through the film to facilitate reading.

It is therefore a principal object of the invention to provide a portable dictionary display device including a roll of film in a casing, the film being driven under control of an operator past a magnifying lens window in the casing.

A further object is to provide a device as described wherein the film is motor driven in forward or reverse directions under control of the operator.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a perspective view of a device embodying one form of the invention.

FIG. 2 is a vertical sectional view taken on line 2—2 of FIG. 1.

FIG. 3 is a vertical sectional view taken on line 3—3 of FIG. 2.

FIG. 4 is a perspective view of part of a casing closure employed in the device.

FIG. 5 is a perspective view similar to FIG. 1 of a device embodying another form of the invention.

FIG. 6 is a sectional view taken on line 6—6 of FIG. 5, certain internal parts being shown in side elevation.

FIG. 7 is a sectional view on an enlarged scale taken on line 7—7 of FIG. 6.

FIG. 8 is a diagram of a circuit employed in the device of FIGS. 5-7.

Referring to FIGS. 1-4, there is shown the device 10 including a rectangular casing having a rectangular front wall 12, rear wall 14, side walls 16, 18, top wall 20 and bottom wall 22. The rear wall 14 and side wall 18 may be integrally formed as a unit. Wall 18 has a dovetail groove 17 formed at its forward edge which engages detachably in a ridge 19 formed at the rear side of wall 12 as seen in FIG. 1. Further spaced projections 21 are formed all around the rear edges of walls 18, 20 and 22 and detachably engage in spaced dovetail recesses 23 formed on the edges of the rear wall 14; see FIGS. 1 and 4. This arrangement permits the walls 14, 18 to be snapped on and off the front body of the casing for assembly and servicing of the device.

The front wall 12 has a rectangular opening 15 defining a window in which is fitted a glass or plastic transparent magnifying lens 24. The lens has a convex front outer face and a flat rear side. On side wall 16 is supported a crank 26 having a shaft 28 extending through a hole 29 in the wall. The interior of the device is shown best in FIGS. 2 and 3, to which specific reference is now made.

Inside the casing are two roller shafts 30, 32 which are frictionally engaged in sockets 31a, 31b and 33a, 33b integrally formed on the side walls 16, 18. Opposite ends of a film 35 are engaged on the shafts. Two rolls 35a and 35b of the film are carried on the respective shafts. The film is entrained over stationary or rotatable guide rods 38, 40 extending across the casing between the side walls 16, 18. Small spur gears 42, 44 are mounted on shafts 30, 32. A large drive gear 34 is mounted on crankshaft 28. Gear 34 can engage with either gear 42 or gear 44 if the crankshaft is pulled axially outward of the casing or is pushed axially inward, respectively. A cylindrical nipple 46 formed on side wall 18 receives the end of the crankshaft to guide axial movement of the crankshaft. This nipple is axially aligned with hole 29 in wall 18.

On the film 35 are printed definitions of various terms 37 in alphabetical order. The definitions are printed in very small type and appear magnified when viewed through lens 24.

The film is advanced by turning the crank 26 in one direction while gears 44 and 34 are engaged. By pushing the crankshaft axially inward of the casing to disengage gears 44, 34 and engage gears 42, 34 the film can be driven in reverse direction. Since gear 34 is much larger than gears 42 or 44, the film will be driven at high speed when the crank is turned rapidly. The user can stop turning the crank at any time when the desired definition 37 comes into view behind the lens 24 on the straight course of film 35 between rods 38, 40.

In FIGS. 5-8 is illustrated a device 10a embodying another form of the invention. Parts corresponding to those of device 10 are identically numbered. The device 10a has a motor 50 mounted on a bracket 52 carried on wall 18a of the casing. A battery 54 can be disposed inside the casing and will be held by spring bracket 56 secured to bottom wall 22a. A double-pole three-position switch 58 is mounted on the underside of the motor. The motor has a shaft 60 provided with a pin 61 extending radially from the end of the shaft. This pin engages in a slot 62 formed longitudinally in the hollow end of shaft 28a. Gear 34a is carried on shaft 28a. The shaft extends through hole 29a in wall 16a and has a knob 64 on its outer end. The shaft 28a can be moved axially inwardly or outwardly without disengaging from the shaft 60. A disk 65 is mounted on the end of shaft 60 and engages peripherally between fingers 66 of a bar 68 which operates the switch 58 to forward, reverse and off positions, when the lever is moved inwardly or outwardly of the switch. Cable 70 connects the switch to the motor and cable 72 connects the switch to the battery.

A lamp 74 is mounted in a socket 75 on the forward side of the motor behind the film 35 centrally of the lens 24; see FIG. 7.

FIG. 8 shows motor 50 connected to one pair of terminals 77, 78 of the switch 58. Battery 54 is connected to central terminals 81, 82 of the switch. Crossed terminals 83, 84 are connected to terminals 78, 77, respectively. Lamp 74 is connected across the battery in series with a push button switch 85. The switch 85 has a button 86 projecting out of front wall 12a of the casing; see FIG. 5.

In operation of the device 10a, the operator can push knob 64 inwardly to engage gears 34a and 42 at the same time switch lever 68 is pushed in to close the direct current motor circuit and energize the motor which will drive the film 35 upwardly and wind it on roll 35a while unwinding it from roll 35b. The operator can then push button 86 to close the circuit of lamp 74. The film will move at rather high speed but the operator can stop the motion of the film at any point by pulling the knob 64 out until the switch 58 opens. Then the operator can manually turn knob 64 attached to shaft 28a until the desired definition 37 appears magnified by lens 24 in window opening 15.

The off position of the motor is indicated on the shaft 28a by indicia 28b; see FIG. 5. If the knob 64 is pulled outwardly then gears 34a and 44 engage and the film is advanced downwardly as the motor is reversed through reversing switch 58. The operator stops the motor by pushing the knob inwardly until the switch 58 opens. At any time the lamp can be illuminated by pressing button 86 inwardly. When the button is released the lamp goes out. If the dictionary definitions are printed on transparent microfilm it is desirable to provide the lamp 74 which will shine through the film and project a magnified image of the desired definition 37 to the operator reading the same.

The devices 10 and 10a are portable. They may use thin plastic film such as polyester, cellulose acetate or the like which is about one mil in thickness. Such thin film can be several hundred feet in length and still form a roll of only a few inches in diameter. Thus a rather comprehensive dictionary with several thousand definitions can be provided on the film. The printing of the definitions in very small type can be done by any of various well known processes for printing microfilm. The lens 24 will be of such focal length as to magnify the printed definitions to readability by the operator without further magnification required.

The casing is so constructed with its snap-on and snap-off back and side that it can readily be opened for assembly of parts, replacement of battery and lamp, and for other servicing as may be required.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A portable dictionary device, comprising a casing including opposing front and rear walls, opposing side walls and opposing top and bottom walls, a film of extended length having opposite ends engaged on a pair of spaced parallel shafts carried at opposite ends by the opposing side walls, said ends of the film forming rolls on the shafts near the top and bottom walls respectively, a pair of guide members disposed near the front wall and entraining a portion of the film between the rolls to define a straight, flat course thereof, said front wall having an opening therein, a lens fitted in said opening to magnify definitions of dictionary terms on the straight course of film, small spur gears carried by the shafts respectively, another shaft disposed between the first-named shafts and carrying a large gear, said other shaft being axially movable to engage its large gear selectively with either of the small spur gears to rotate the same, said other shaft having one end extending through one of the side walls and outside of the casing for manual turning to advance the film past said opening and to position any particular definition behind the lens, a motor carried by the other side wall, said motor having a rotatable shaft slidably keyed to said other shaft to permit movement of said other shaft between inner and outer extreme positions through an intermediate position, a double-pole three-position reversing switch in the casing having two closed positions and one open position, said switch having an operating bar for moving the switch to any of the three positions thereof, and means carried by said other shaft engaged with said bar to close and open the switch when said other shaft is moved axially, whereby the film is operatively driven in either of two directions by the motor when said other shaft is in either one of the inner and outer extreme positions and the switch is in either of the two closed positions, said means being a disk secured to said other shaft and, a right angularly disposed portion at the end of said bar, a fork at the end of said right angularly disposed portion and extending on opposite sides of said disk, linear movement of said disk being imparted through said fork and said right angularly disposed extension to said bar during rotation of said disk in any rotative position of said other shaft for operating said switch in all positions of said other shaft.

References Cited in the file of this patent

UNITED STATES PATENTS

| | | |
|---|---|---|
| 2,033,926 | Decker | Mar. 17, 1936 |
| 2,045,249 | Petersen et al. | June 23, 1936 |
| 2,156,432 | McDowell et al. | May 2, 1939 |
| 2,182,084 | Keilwagen | Dec. 5, 1939 |
| 2,195,782 | Perritt | Apr. 2, 1940 |
| 2,398,226 | Holland | Apr. 9, 1946 |
| 2,657,487 | Sprung | Nov. 3, 1953 |
| 2,687,259 | Owens | Aug. 24, 1954 |
| 2,729,006 | Olsson | Jan. 3, 1956 |
| 3,003,271 | Purling | Oct. 10, 1961 |

FOREIGN PATENTS

| | | |
|---|---|---|
| 231,214 | Great Britain | Apr. 2, 1925 |
| 260,750 | Italy | Oct. 12, 1928 |